United States Patent
Hasegawa et al.

(10) Patent No.: US 10,000,090 B2
(45) Date of Patent: **\*Jun. 19, 2018**

(54) PNEUMATIC RADIAL TIRE FOR PASSENGER VEHICLE

(71) Applicant: BRIDGESTONE CORPORATION, Chuo-ku, Tokyo (JP)

(72) Inventors: Kohei Hasegawa, Kodaira (JP); Isao Kuwayama, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/355,738

(22) PCT Filed: Nov. 2, 2012

(86) PCT No.: PCT/JP2012/007052
§ 371 (c)(1),
(2) Date: May 1, 2014

(87) PCT Pub. No.: WO2013/065322
PCT Pub. Date: May 10, 2013

(65) Prior Publication Data
US 2014/0299247 A1    Oct. 9, 2014

(30) Foreign Application Priority Data
Nov. 2, 2011   (JP) .................. 2011-241672

(51) Int. Cl.
*B60C 3/00* (2006.01)
*B60C 3/04* (2006.01)
(Continued)

(52) U.S. Cl.
CPC .................. *B60C 3/04* (2013.01); *B60C 9/18* (2013.01); *B60C 9/2009* (2013.01); *B60C 9/28* (2013.01);
(Continued)

(58) Field of Classification Search
CPC ..................................... B60C 3/00; B60C 3/04
See application file for complete search history.

(56) References Cited

U.S. PATENT DOCUMENTS 3,786,851 A * 1/1974 Mirtain ..................... B60C 9/20
152/527
4,120,337 A   10/1978 Soma et al.
(Continued)

FOREIGN PATENT DOCUMENTS

BG        61716   *  4/1998
CN     1436128 A      8/2003
(Continued)

OTHER PUBLICATIONS

Machine translation of JP 2000-190706, 2000.*
(Continued)

*Primary Examiner* — Justin R Fischer
(74) *Attorney, Agent, or Firm* — Sughrue Mion, PLLC

(57) ABSTRACT

The present invention provides a pneumatic radial tire for a passenger vehicle, having: a cross sectional width SW and an outer diameter OD controlled under an appropriate SW-OD relationship; and an optimized configuration of a crown portion thereof.

24 Claims, 5 Drawing Sheets

(51) Int. Cl.
*B60C 11/00* (2006.01)
*B60C 9/20* (2006.01)
*B60C 9/28* (2006.01)
*B60C 9/18* (2006.01)
B60C 9/22 (2006.01)
B60C 9/00 (2006.01)

(52) U.S. Cl.
CPC .. *B60C 11/0083* (2013.01); *B60C 2009/0078* (2013.01); *B60C 2009/2257* (2013.01); *B60C 2009/2261* (2013.01)

(56) References Cited

U.S. PATENT DOCUMENTS

| | | | |
|---|---|---|---|
| 4,688,615 A | | 8/1987 | Lee |
| 5,178,703 A | * | 1/1993 | Onoda et al. ............. 152/533 |
| 5,309,963 A | * | 5/1994 | Kakumu et al. ......... 152/209.18 |
| 6,481,479 B1 | * | 11/2002 | Weed .................. B60C 9/20 152/209.12 |
| 9,266,396 B2 | * | 2/2016 | Hatanaka ............ B60C 11/04 |
| 2011/0114238 A1 | | 5/2011 | Takahashi et al. |

FOREIGN PATENT DOCUMENTS

| | | | |
|---|---|---|---|
| CN | 101646571 A | | 2/2010 |
| EP | 370699 | * | 5/1999 |
| FR | 2719525 | * | 11/1995 |
| JP | 53040903 | * | 4/1978 |
| JP | 60148702 A | | 8/1985 |
| JP | 03121911 A | | 5/1991 |
| JP | 3197206 A | | 8/1991 |
| JP | 3-213404 | * | 9/1991 |
| JP | 07-40706 A | | 2/1995 |
| JP | 7242105 A | | 9/1995 |
| JP | 09277804 A | | 10/1997 |
| JP | 10109502 A | | 4/1998 |
| JP | 2000-190706 | * | 7/2000 |
| JP | 2000190706 A | | 7/2000 |
| JP | 2001121915 A | | 5/2001 |
| JP | 2001171318 A | | 6/2001 |
| JP | 2005219537 A | | 8/2005 |
| JP | 2006193032 A | | 7/2006 |
| JP | 2007186123 A | | 7/2007 |
| JP | 2009-166819 A | | 7/2009 |
| JP | 2009-279948 A | | 12/2009 |
| JP | 2010-47191 | * | 3/2010 |
| JP | 2010-254032 A | | 11/2010 |
| JP | 2011207283 A | | 10/2011 |
| WO | WO 80/00236 | * | 2/1980 |

OTHER PUBLICATIONS

Machine translation of FR 2719525, 1995.*
International Search Report of PCT/JP2012/007052 dated Dec. 11, 2012.
Communication dated Apr. 30, 2015 from the European Patent Office in counterpart European Application No. 12845245.5.
Communication dated Dec. 31, 2014 from the State Intellectual Property Office of People's Republic of China in counterpart Application No. 201280053945.9.
Communication dated Aug. 18, 2015, issued by the Japan Patent Office in corresponding Japanese Application No. 2013-541641.
Communication dated Jun. 9, 2015 from the Japanese Patent Office in counterpart application No. 2013-541641.
Communication dated Oct. 5, 2017 from the United States Patent and Trademark Office in counterpart U.S. Appl. No. 13/695,399.
Communication dated Aug. 25, 2017 from the United States Patent and Trademark Office in counterpart U.S. Appl. No. 14/128,397.
Communication dated Sep. 21, 2017 from the United States Patent and Trademark Office in counterpart U.S. Appl. No. 14/355,597.
Communication dated Oct. 19, 2017 from the United States Patent and Trademark Office in counterpart U.S. Appl. No. 14/235,262.
Communication dated Jan. 17, 2018 from the United States Patent and Trademark Office in counterpart U.S. Appl. No. 14/240,658.
Machine Translation of JP 3-213404 A (no date).
05-07 Cadillac STS Factory Goodyear T145/70R17 Spare Wheel Tire OEM V8 as accessed from http://www.ebay.com/itm/05-07-CADILLAC-STS-FACTORY-GOODYEAR-T145-70R17-SPARE-WHEEL-TIRE-OEM-V8-/172734714482 on Aug. 14, 2017.
Spare tyre wheel T165/70D16 Toyota Celica ZZ T23 Coupe 1.8 16V VT-i Yr 99-02 as accessed from http://www.ebay.com/itm/Spare-tyre-wheel-T165-70D16-Toyota-Celica-ZZ-T23-Coupe-1-8-16V-VT-i-Yr-99-02-/381718694058 on Aug. 17, 2017.

* cited by examiner

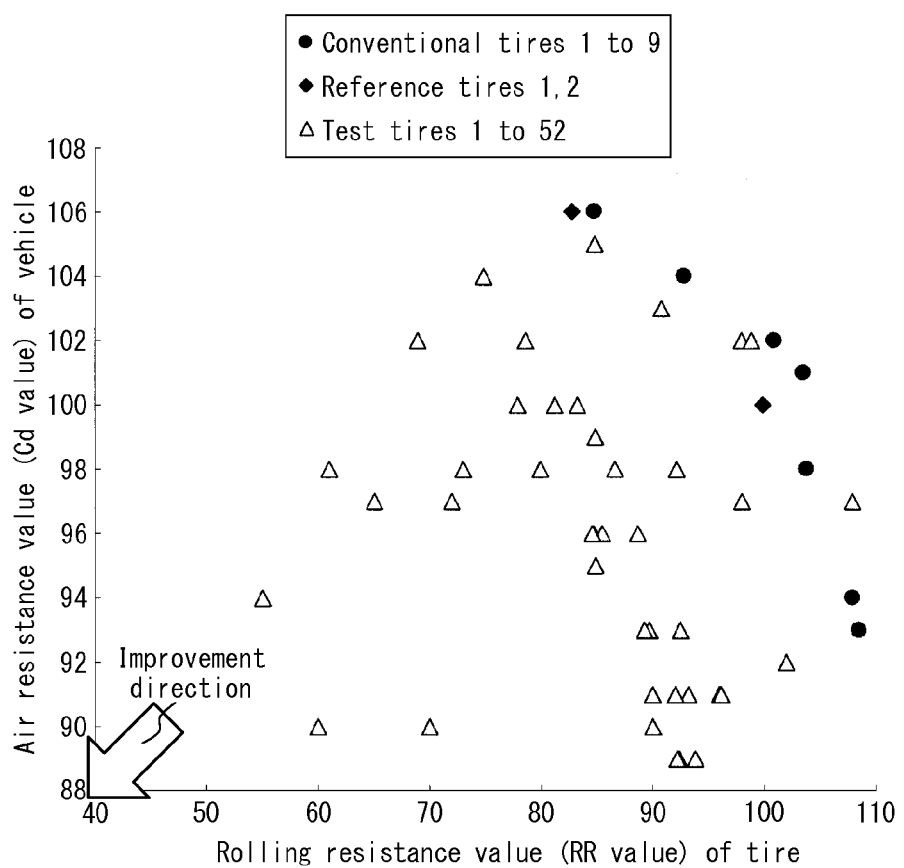

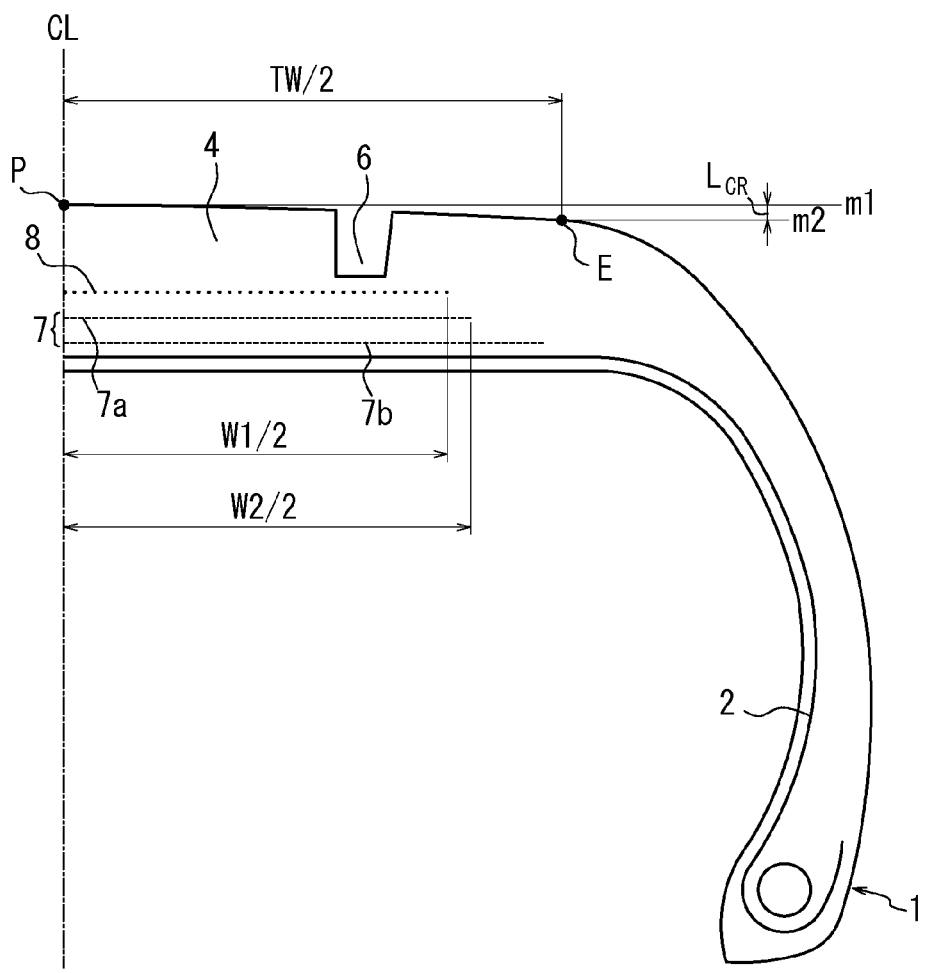

PNEUMATIC RADIAL TIRE FOR PASSENGER VEHICLE

CROSS REFERENCE TO RELATED APPLICATIONS

This is a National Stage of International Application No. PCT/JP2012/007052 filed Nov. 2, 2012, claiming priority based on Japanese Patent Application No. 2011-241672 filed Nov. 2, 2011, the contents of all of which are incorporated herein by reference in their entirety.

TECHNICAL FIELD

The present invention relates to a pneumatic radial tire for a passenger vehicle.

BACKGROUND ART

Bias tires having relatively narrow cross sectional widths were predominantly used in vehicles up to around 1960 because vehicles in those days were relatively lightweight, had relatively low cruising speed required thereof and thus did not put so much stress on the tires. However, radial tires having wide and flat structures are predominant these days because good driving stability in high speed running, as well as good wear resistance, is required of tires as highway networks are developed and vehicle speed increases (e.g. PTL 1).

However, increasing widths of tires decreases free space in a vehicle and deteriorates comfortablility therein. This is becoming a big issue because electric vehicles which have been developed for use in recent years, in particular, must have sufficient space for accommodating driving units such as a motor for controlling torque of rotating tires around drive shafts and in this regard ensuring sufficient space in vicinities of tires thereof is increasingly important.

Further, there has been increasingly a demand for a better fuel efficiency in recent years as people are more concerned about environmental issues. It has been conventionally known that increasing diameter and width of a tire is effective in terms of decreasing rolling resistance value (RR value) of the tire for better fuel efficiency thereof. Increasing diameter and width of a tire, however, also increases weight of the tire and air resistance of a vehicle, thereby resulting in an increase in resistance experienced by the vehicle and too much load on the tire.

In this connection, decreasing diameter and width of a tire to reduce weight thereof then results in deterioration of controllability of the tire.

CITATION LIST

Patent Literature

PTL 1: JP-A 07-040706

SUMMARY OF THE INVENTION

Technical Problems

It is in general difficult to achieve good fuel efficiency, good comfortablility in a vehicle (free space in a vehicle) and other good performances of a tire simultaneously in a compatible manner, as described above. A technique of comprehensively improving these performances in a compatible manner has therefore been demanded.

The present invention aims at solving the problems described above and an object thereof is to provide a pneumatic radial tire for a passenger vehicle where durability and wear resistance of the tire have been improved with ensuring high fuel efficiency and wide free space in a vehicle.

Solution to the Problems

The inventors of the present invention keenly studied to solve the problems described above.

As a result, the inventors first discovered that reducing a tire width and increasing a tire diameter or, more specifically, controlling a cross sectional width SW and an outer diameter OD of a radial tire under an appropriate SW-OD relationship is very effective in terms of ensuring good fuel efficiency and wide free space of a vehicle using the radial tire.

Further, the inventors newly discovered that it is effective to optimize configuration of a crown portion of a radial tire having small width and large diameter in terms of improving durability and wear resistance of the tire.

The present invention has been contrived based on the aforementioned discoveries and main structural features are as follows.

(1) A pneumatic radial tire for a passenger vehicle, having a carcass constituted of plies as radially-disposed carcass cords and provided in a toroidal shape across a pair of bead portions, a belt constituted of at least one belt layer, and at least one belt reinforcing layer as a rubber-coated cord layer extending in the tire circumferential direction, the belt and the belt reinforcing layer being provided on the outer side in the tire radial direction of the carcass, characterized in that:

provided that SW and OD represent cross sectional width and outer diameter of the tire, respectively, SW/OD≤0.26 when SW<165 (mm) and SW and OD satisfy a formula shown below when SW≥165 (mm)

$$OD \geq 2.135 \times SW + 282.3; \text{ and}$$

provided, in a cross section in the width direction of the tire, that: m1 represents an imaginary line passing through a point P on a tread surface at the tire equatorial plane and extending in parallel to the tire width direction; m2 represents an imaginary line passing through a ground contact end E and extending in parallel to the tire width direction; $L_{CR}$ represents a distance in the tire radial direction between line m1 and line m2; and TW represents a tread width of the tire, a ratio $L_{CR}/TW \leq 0.045$.

In the present invention, the aforementioned "ground contact end E" represents in a cross section in the tire width direction of a tire each of respective end points in the tire width direction of a ground contact surface of the tire in contact with a flat plate when the tire is placed upright with respect to the flat plate in a standard state where the tire is assembled with a rim and inflated at the maximum air pressure under the maximum load respectively prescribed for each vehicle on which the tire is to be mounted.

The aforementioned "tread width TW" and "distance $L_{CR}$" of a tire are to be measured, respectively, in a state where the tire is assembled with a rim, inflated at the maximum air pressure prescribed for each vehicle on which the tire is to be mounted, and has no load exerted thereon. The "tread width TW" specifically represents a distance in the tire width direction between the ground contact ends E, E of the tire in this (no load) state.

The "distance $L_{CR}$" specifically represents a distance in the tire radial direction between line m1 and line m2 of the tire in this state.

"The maximum load prescribed for each passenger vehicle" represents in the present invention the largest load value among respective four load values exerted on four tires of the passenger vehicle when the prescribed upper limit number of occupants ride in the passenger vehicle.

(2) A pneumatic radial tire for a passenger vehicle, having a carcass constituted of plies as radially-disposed carcass cords and provided in a toroidal shape across a pair of bead portions, a belt constituted of at least one belt layer, and at least one belt reinforcing layer as a rubber-coated cord layer extending in the tire circumferential direction, the belt and the belt reinforcing layer being provided on the outer side in the tire radial direction of the carcass, characterized in that:

provided that SW and OD represent cross sectional width and outer diameter of the tire, respectively, SW and OD satisfy a formula shown below $$OD \geq -0.0187 \times SW^2 + 9.15 \times SW - 380; \text{ and}$$

provided, in a cross section in the tire width direction of the tire, that: m1 represents an imaginary line passing through a point P on a tread surface at the tire equatorial plane and extending in parallel to the tire width direction; m2 represents an imaginary line passing through a ground contact end E and extending in parallel to the tire width direction; $L_{CR}$ represents a distance in the tire radial direction between line m1 and line m2; and TW represents a tread width of the tire, a ratio $L_{CR}/TW \leq 0.045$.

Advantageous Effect of the Invention

According to the present invention, it is possible to provide a pneumatic radial tire for a passenger vehicle having excellent durability and wear resistance with ensuring high fuel efficiency of and wide free space in a vehicle.

BRIEF DESCRIPTION OF THE DRAWINGS

FIG. 5 is a graph showing a relationship between rolling resistance value and air resistance value in each of the test tires.

FIG. 6 is a schematic cross sectional view of a half portion of a radial tire according to one embodiment of the present invention.

DESCRIPTION OF THE EMBODIMENTS

How a pneumatic radial tire for a passenger vehicle of the present invention (which tire will be referred to simply as a "tire" hereinafter) has been realized will be described below.

Figure 1:
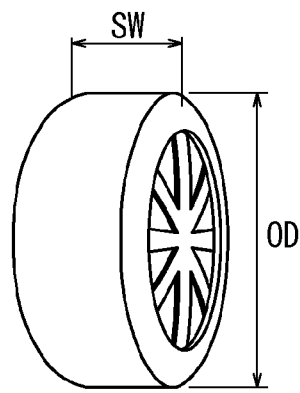
FIG. 1 is a view showing a cross sectional width SW and an outer diameter OD of a tire.
Figures 2A, 2B:
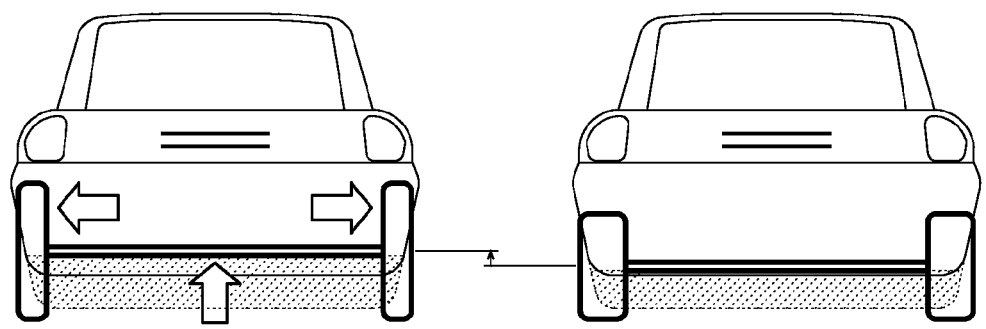
FIG. 2A is a view showing a vehicle having the tires of the present invention with large diameters and narrow widths mounted thereon.
FIG. 2B is a view showing a vehicle having the conventional tires mounted thereon.

First, the inventors of the present invention paid attention to a fact that a tire cross sectional width SW (see FIG. 1) of a radial tire smaller than that of the conventional radial tire ensures a wide free space in a vehicle, a wide space for accommodating a driving member in vicinities on the vehicle-inner side of the tire in particular (see FIGS. 2A and 2B).

A tire cross sectional width SW of a radial tire smaller than that of the conventional radial tire also causes a good effect of reducing an air resistance value (Cd value) of the vehicle because an area of the tire viewed from the front thereof decreases.

However, there is a demerit in this case in that a rolling resistance value (RR value) of the tire increases due to an increase in magnitude of deformation of a ground contact portion of a tread when the internal air pressure of the tire remains the same.

The inventors of the present invention, in view of the aforementioned situation, discovered that the problem can be solved by utilizing the characteristics inherent to a radial tire. Specifically, the inventors of the present invention realized that, in the case of a radial tire having a smaller magnitude of tread deformation than a bias tire, it is possible to make the radial tire be less affected by a rough road surface and thus reduce a rolling resistance value (RR value) thereof when the internal air pressure remains the same by increasing the outer diameter OD (see FIG. 1) of the radial tire as compared with the conventional radial tire. Further, the inventors of the present invention also realized that an increase in outer diameter OD of a radial tire enhances the loading capacity of the tire. Yet further, an increase in outer diameter of a radial tire increases height of drive shafts to enlarge an under-chassis space, as shown in FIG. 2A, thereby allowing the vehicle to keep wide spaces for a car boot, driving units and the like.

In short, reducing width and increasing outer diameter of a tire effectively ensure a wide space in a vehicle, respectively, although they are in a trade-off relationship in terms of a rolling resistance value (RR value). Reducing tire width also successfully decreases an air resistance value (Cd value) of a vehicle.

In view of this, the inventors of the present invention keenly studied optimizing a relationship between a tire cross sectional width and an outer diameter of a tire such that an air resistance value (Cd value) and a rolling resistance value (RR value) of a vehicle improve as compared with the conventional radial tire.

Specifically, the inventors of the present invention, paying their attention to a relationship between a tire cross sectional width SW and an outer diameter OD of a tire, carried out a test including mounting test tires of various tire sizes (some of them were non-standard products) on a vehicle and measuring an air resistance value (Cd value) and a rolling resistance value (RR value) for each type or size of the test tires. A condition satisfied by SW and OD when both of an air resistance value and a rolling resistance value were superior to those of the conventional radial tire was empirically deduced based on the measurement results.

The experiment results from which the optimum relationship between SW and OD was obtained will be described in detail hereinafter.

Figure 3:
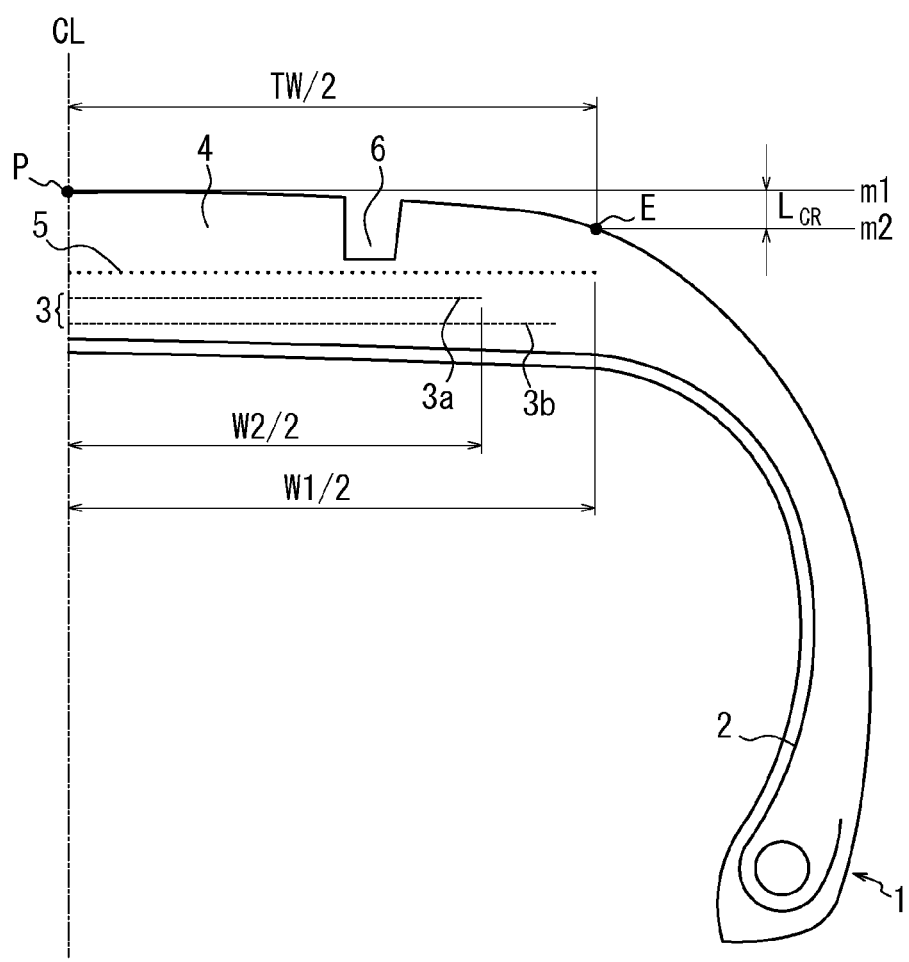
FIG. 3 is a schematic cross sectional view of a half portion of a radial tire used in a test in the present invention.

FIG. 3 is a schematic cross sectional view, in the tire width direction, of a tire used in the aforementioned test. FIG. 3 shows only one half portion with respect to the tire equatorial plane CL of the tire. The other half portion of the tire shares basically the same structure as the one half portion and therefore illustration thereof will be omitted.

FIG. 3 shows a tire in a state where the tire has been assembled with a rim and inflated at the air pressure prescribed for each vehicle on which the tire is to be mounted under no load exerted thereon.

A plurality of pneumatic radial tires, each having a pair of bead portions 1 and a carcass 2 radially disposed to extend in a toroidal shape across the pair of bead portions 1 as shown in FIG. 3, were prepared as test tires of various tire sizes.

The tire exemplarily shown in FIG. 3 has the carcass 2 constituted of organic fibers, a belt 3 constituted of at least one belt layer (two belt layers 3a, 3b in FIG. 3) and a tread 4 such that the belt 3 and the tread 4 are provided on the outer side in the tire radial direction of a crown portion of the carcass 2 in this order. The two belt layers 3a, 3b shown in FIG. 3 are slant belt layers provided such that belt cords of one layer intersect belt cords of the other layer alternately and that the belt cords of each layer are inclined at an inclination angle in the range of ±20° to ±75° with respect to the tire equatorial plane CL. Further, the tire exemplarily shown in FIG. 3 has at least one belt reinforcing layer 5 (a single layer in FIG. 3) as a rubber-coated cord layer in which cords are spirally wound along the tire equatorial plane CL to extend substantially in the tire circumferential direction such that the belt reinforcing layer 5 is disposed on the outer side in the tire radial direction of the belt layer 3.

The belt reinforcing layer 5 can be formed by using cords made or organic fibers such as nylon, Kevlar® or the like. The belt reinforcing layer 5 exemplarily shown in FIG. 3 includes cords made of nylon and having Young's modulus: 3.2 GPa and fineness: 1400 dtex such that the cords are implanted in the belt reinforcing layer at the cord implantation number of 50 (number of cords/50 mm). "Young's modulus" represents Young's modulus to be determined by a test according to JIS L1017 8.5 a) (2002) and calculated according to JIS L1017 8.8 (2002) in the present invention. The same structural principles as described are applied to each of the test tires of the present invention.

A plurality of main grooves 6 each extending in the tire circumferential direction are formed in the tread 4 (one main groove in each half portion of the tire exemplarily shown in FIG. 3).

In the tire as exemplarily shown in FIG. 3, a ratio W1/W2 of a width W1 in the tire width direction of the belt reinforcing layer 5 with respect to a width W2 in the tire width direction of the belt layer 3a having the narrowest tire-width-direction width among the belt layers of the belt 3 is 1.1. Such a belt layer as the belt layer 3a may occasionally be referred to as "the narrowest width belt layer" hereinafter. The "width W1" and the "width W2" described above each represent a corresponding width measured in a state where the tire has been assembled with a rim and inflated at the air pressure prescribed for each vehicle on which the tire is to be mounted under no load exerted thereon.

Further, a ratio $L_{CR}/TW$ of a distance $L_{CR}$ with respect to a tread width TW, as defined above, is 0.05 in the tire as shown in FIG. 3.

A number of test tires having various cross sectional widths and outer diameters were prepared based on the tire structures described above.

First, there was prepared as Reference tire 1 a tire having tire size: 195/65R15, which tire size is used in vehicles of the most common types and thus suitable for comparison of tire performances. There was also prepared as Reference tire 2 a tire having tire size: 225/45R17, which is what is called an "inch-up" version of Reference tire 1.

Further, there were also prepared other test tires (test tires 1 to 52 and conventional test tires 1 to 9) of various tire sizes. These test tires were each assembled with a rim, inflated at internal pressure of 220 kPa and subjected to the tests described below.

Table 1 shows relevant characteristics of the respective test tires.

With regard to tire sizes, a variety of tire sizes including the conventional sizes prescribed in JATMA (The Japan Automobile Tyre Manufacturers Association, Inc.) in Japan, TRA (THE TIRE and THE RIM ASSOCIATION INC.) in the United States, ETRTO (European Tyre and Rim Technical Organisation) in Europe and the like and those beyond these conventional sizes were widely studied.

TABLE 1

| | Tire size | SW (mm) | OD (mm) | SW/OD |
|---|---|---|---|---|
| Conventional tire 1 | 145/70R12 | 145 | 507.8 | 0.29 |
| Conventional tire 2 | 155/55R14 | 155 | 526.1 | 0.29 |
| Conventional tire 3 | 165/60R14 | 165 | 553.6 | 0.30 |
| Conventional tire 4 | 175/65R14 | 175 | 583.1 | 0.30 |
| Conventional tire 5 | 185/60R15 | 185 | 603 | 0.31 |
| Conventional tire 6 | 205/55R16 | 205 | 631.9 | 0.32 |
| Conventional tire 7 | 215/60R16 | 215 | 664.4 | 0.32 |
| Conventional tire 8 | 225/55R17 | 225 | 679.3 | 0.33 |
| Conventional tire 9 | 245/45R18 | 245 | 677.7 | 0.36 |
| Reference tire 1 | 195/65R15 | 195 | 634.5 | 0.31 |
| Reference tire 2 | 225/45R17 | 225 | 634.3 | 0.35 |
| Test tire 1 | 155/55R21 | 155 | 704.5 | 0.22 |
| Test tire 2 | 165/55R21 | 165 | 717.4 | 0.23 |
| Test tire 3 | 155/55R19 | 155 | 653.1 | 0.24 |
| Test tire 4 | 155/70R17 | 155 | 645.8 | 0.24 |
| Test tire 5 | 165/55R20 | 165 | 689.5 | 0.24 |
| Test tire 6 | 165/65R19 | 165 | 697.1 | 0.24 |
| Test tire 7 | 165/70R18 | 165 | 687.5 | 0.24 |
| Test tire 8 | 165/55R16 | 165 | 589.3 | 0.28 |
| Test tire 9 | 175/65R15 | 175 | 625.0 | 0.28 |
| Test tire 10 | 185/60R17 | 185 | 660.7 | 0.28 |
| Test tire 11 | 195/65R17 | 195 | 696.4 | 0.28 |
| Test tire 12 | 205/60R18 | 205 | 732.1 | 0.28 |
| Test tire 13 | 185/50R16 | 185 | 596.8 | 0.31 |
| Test tire 14 | 205/60R16 | 205 | 661.3 | 0.31 |
| Test tire 15 | 215/60R17 | 215 | 693.5 | 0.31 |
| Test tire 16 | 225/65R17 | 225 | 725.8 | 0.31 |
| Test tire 17 | 155/45R21 | 155 | 672.9 | 0.23 |
| Test tire 18 | 205/55R16 | 205 | 631.9 | 0.32 |
| Test tire 19 | 165/65R19 | 165 | 697.1 | 0.24 |
| Test tire 20 | 155/65R18 | 155 | 658.7 | 0.24 |
| Test tire 21 | 145/65R19 | 145 | 671.1 | 0.22 |
| Test tire 22 | 135/65R19 | 135 | 658.1 | 0.21 |
| Test tire 23 | 125/65R19 | 125 | 645.1 | 0.19 |
| Test tire 24 | 175/55R22 | 175 | 751.3 | 0.23 |
| Test tire 25 | 165/55R20 | 165 | 689.5 | 0.24 |
| Test tire 26 | 155/55R19 | 155 | 653.1 | 0.24 |
| Test tire 27 | 145/55R20 | 145 | 667.5 | 0.22 |
| Test tire 28 | 135/55R20 | 135 | 656.5 | 0.21 |
| Test tire 29 | 125/55R20 | 125 | 645.5 | 0.19 |
| Test tire 30 | 175/45R23 | 175 | 741.7 | 0.24 |
| Test tire 31 | 165/45R22 | 165 | 707.3 | 0.23 |
| Test tire 32 | 155/45R21 | 155 | 672.9 | 0.23 |
| Test tire 33 | 145/45R21 | 145 | 663.9 | 0.22 |
| Test tire 34 | 135/45R21 | 135 | 654.9 | 0.21 |
| Test tire 35 | 145/60R16 | 145 | 580.4 | 0.25 |
| Test tire 36 | 155/60R17 | 155 | 617.8 | 0.25 |
| Test tire 37 | 165/55R19 | 165 | 664.1 | 0.25 |
| Test tire 38 | 155/45R18 | 155 | 596.7 | 0.26 |
| Test tire 39 | 165/55R18 | 165 | 638.7 | 0.26 |
| Test tire 40 | 175/55R19 | 175 | 675.1 | 0.26 |
| Test tire 41 | 115/50R17 | 115 | 546.8 | 0.21 |
| Test tire 42 | 105/50R16 | 105 | 511.4 | 0.21 |
| Test tire 43 | 135/60R17 | 135 | 593.8 | 0.23 |
| Test tire 44 | 185/60R20 | 185 | 730 | 0.25 |
| Test tire 45 | 185/50R20 | 185 | 693.0 | 0.27 |
| Test tire 46 | 195/60R19 | 195 | 716.6 | 0.27 |
| Test tire 47 | 175/60R18 | 175 | 667.2 | 0.26 |
| Test tire 48 | 195/55R20 | 195 | 722.5 | 0.27 |

TABLE 1-continued

| | Tire size | SW (mm) | OD (mm) | SW/OD |
|---|---|---|---|---|
| Test tire 49 | 215/50R21 | 215 | 748.4 | 0.29 |
| Test tire 50 | 205/55R20 | 205 | 733.5 | 0.28 |
| Test tire 51 | 185/45R22 | 185 | 716.3 | 0.26 |
| Test tire 52 | 155/65R13 | 155 | 634.3 | 0.29 |

<Rolling Resistance (RR Value)>

Rolling resistance was measured by: assembling each of the test tires described above with a rim to obtain a tire-rim assembly inflated at internal pressure as shown in Tables 2-1 and 2-2; exerting on the tire-rim assembly the maximum load prescribed for a vehicle on which the tire is mounted; and running the tire at drum rotation speed of 100 km/hour to measure a rolling resistance thereof.

The evaluation results are shown as index values relative to "100" of Reference tire 1.

The smaller index value represents the smaller rolling resistance.

<Air Resistance (Cd) Value of Vehicle>

Air resistance was determined by: assembling each of the test tires described above with a rim to obtain a tire-rim assembly inflated at internal pressure as shown in Tables 2-1 and 2-2; mounting the tire-rim assembly on a vehicle of 1500 cc displacement; and blasting air on the tire at speed corresponding to 100 km/hour and measuring an air pressure value experienced by the tire by a balance installed on the floor under the tire. The results were converted to index values relative to "100" of Reference tire 1 for evaluation. The smaller index value represents the smaller air resistance.

Figure 4A:
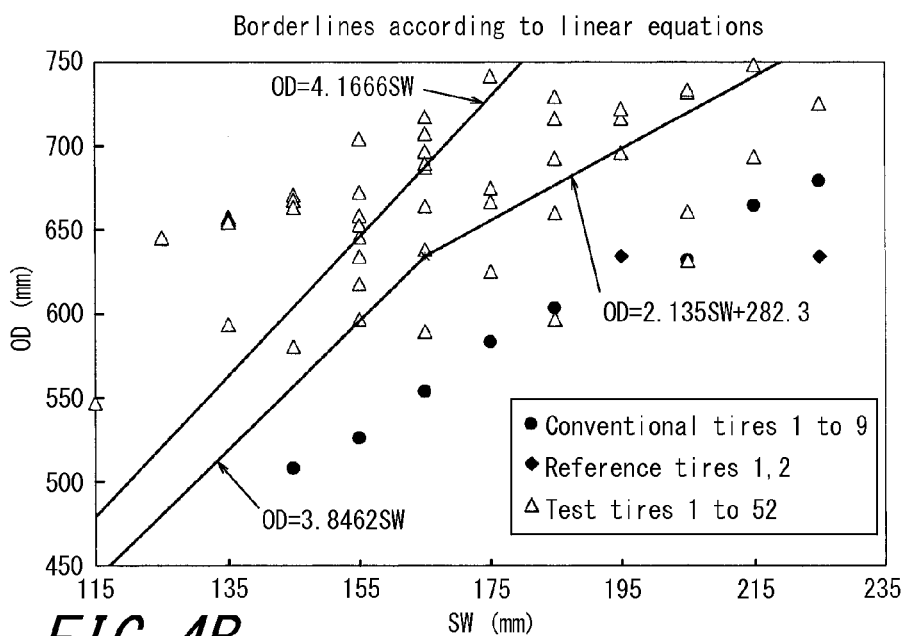
FIG. 4A is a graph showing relationships between SW and OD observed in the test tires of the present invention and the conventional test tires.
Figure 4B:
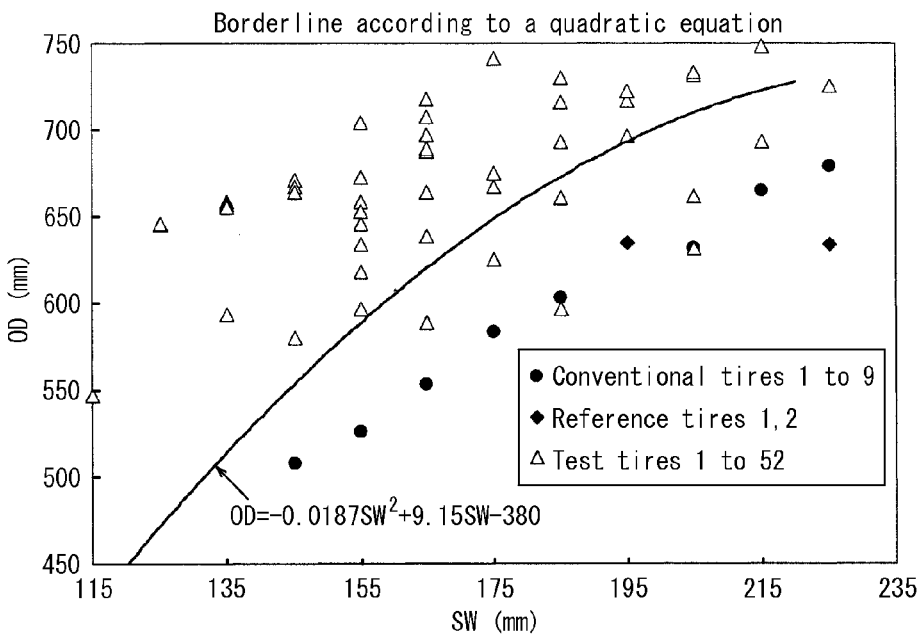
FIG. 4B is a graph showing a relationship between SW and OD observed in the test tires of the present invention and the conventional test tires.

The evaluation results are shown in Tables 2-1, 2-2 and FIGS. 4A, 4B.

TABLE 2-1

| | Tire size | Internal pressure (kPa) | RR value (INDEX) | Cd value (INDEX) |
|---|---|---|---|---|
| Conventional tire 1 | 145/70R12 | 295 | 108 | 94 |
| Conventional tire 2 | 155/55R14 | 275 | 111.3 | 91 |
| Conventional tire 3 | 165/60R14 | 260 | 108.6 | 93 |
| Conventional tire 4 | 175/65R14 | 245 | 103.6 | 101 |
| Conventional tire 5 | 185/60R15 | 230 | 103.9 | 98 |
| Conventional tire 6 | 205/55R16 | 220 | 101 | 102 |
| Conventional tire 7 | 215/60R16 | 220 | 93 | 104 |
| Conventional tire 8 | 225/55R17 | 220 | 85 | 106 |
| Conventional tire 9 | 245/45R18 | 220 | 80 | 111 |
| Reference tire 1 | 195/65R15 | 220 | 100 | 100 |
| Reference tire 2 | 225/45R17 | 220 | 83 | 106 |
| Test tire 1 | 155/55R21 | 220 | 60 | 90 |
| Test tire 2 | 165/55R21 | 220 | 55 | 94 |
| Test tire 3 | 155/55R19 | 220 | 90 | 90 |
| Test tire 4 | 155/70R17 | 220 | 85 | 95 |
| Test tire 5 | 165/55R20 | 220 | 72 | 97 |
| Test tire 6 | 165/65R19 | 220 | 65 | 97 |
| Test tire 7 | 165/70R18 | 220 | 61 | 98 |
| Test tire 8 | 165/55R16 | 220 | 102 | 92 |
| Test tire 9 | 175/65R15 | 220 | 98 | 97 |
| Test tire 10 | 185/60R17 | 220 | 85 | 99 |
| Test tire 11 | 195/65R17 | 220 | 78 | 100 |
| Test tire 12 | 205/60R18 | 220 | 69 | 102 |
| Test tire 13 | 185/50R16 | 220 | 108 | 97 |
| Test tire 14 | 205/60R16 | 220 | 98 | 102 |
| Test tire 15 | 215/60R17 | 220 | 91 | 103 |
| Test tire 16 | 225/60R17 | 220 | 85 | 105 |
| Test tire 17 | 155/45R21 | 220 | 70 | 90 |
| Test tire 18 | 205/55R16 | 220 | 99 | 102 |
| Test tire 19 | 165/65R19 | 260 | 92.2 | 98 |
| Test tire 20 | 155/65R18 | 275 | 96 | 91 |

TABLE 2-2

| | Tire size | Internal pressure (kPa) | RR value (INDEX) | Cd value (INDEX) |
|---|---|---|---|---|
| Test tire 21 | 145/65R19 | 295 | 92.4 | 89 |
| Test tire 22 | 135/65R19 | 315 | 91.6 | 87 |
| Test tire 23 | 125/65R19 | 340 | 88.2 | 85 |
| Test tire 24 | 175/55R22 | 345 | 84.8 | 96 |
| Test tire 25 | 165/55R20 | 260 | 92.6 | 93 |
| Test tire 26 | 155/55R19 | 275 | 96.2 | 91 |
| Test tire 27 | 145/55R20 | 290 | 92.3 | 89 |
| Test tire 28 | 135/55R20 | 310 | 92.4 | 87 |
| Test tire 29 | 125/55R20 | 340 | 87.7 | 85 |
| Test tire 30 | 175/45R23 | 250 | 85.5 | 96 |
| Test tire 31 | 165/45R22 | 255 | 89.7 | 93 |
| Test tire 32 | 155/45R21 | 270 | 93.2 | 91 |
| Test tire 33 | 145/45R21 | 290 | 92.2 | 89 |
| Test tire 34 | 135/45R21 | 310 | 92.1 | 87 |
| Test tire 35 | 145/60R16 | 290 | 93.9 | 89 |
| Test tire 36 | 155/60R17 | 270 | 92.1 | 91 |
| Test tire 37 | 165/55R19 | 255 | 89.4 | 93 |
| Test tire 38 | 155/45R18 | 270 | 92.1 | 91 |
| Test tire 39 | 165/55R18 | 255 | 89.4 | 93 |
| Test tire 40 | 175/55R19 | 250 | 88.7 | 96 |
| Test tire 41 | 115/50R17 | 350 | 86.7 | 83 |
| Test tire 42 | 105/50R16 | 350 | 94.1 | 80 |
| Test tire 43 | 135/60R17 | 300 | 85.6 | 87 |
| Test tire 44 | 185/60R20 | 270 | 73.0 | 98 |
| Test tire 45 | 185/50R20 | 270 | 80.0 | 98 |
| Test tire 46 | 195/60R19 | 258 | 81.3 | 100 |
| Test tire 47 | 175/60R18 | 286 | 84.7 | 96 |
| Test tire 48 | 195/55R20 | 277 | 83.3 | 100 |
| Test tire 49 | 215/50R21 | 250 | 75.0 | 104 |
| Test tire 50 | 205/55R20 | 263 | 78.7 | 102 |
| Test tire 51 | 185/45R22 | 285 | 86.7 | 98 |
| Test tire 52 | 155/65R13 | 220 | 90 | 91 |

It has been revealed from the test results shown in Tables 2-1 and 2-2, FIG. 4A and FIG. 5 that a radial tire exhibits satisfactorily low air resistance value (Cd value) and rolling resistance value (RR value) in a compatible manner in a state where the tire is mounted on a vehicle, as compared with Reference tire 1 having tire size: 195/65R15 as the conventional tire, when the tire has a tire size satisfying the following formulae (which formulae will be referred to as "relationship formulae (1)" hereinafter), provided that SW and OD represent cross sectional width and outer diameter of the tire, respectively.

$SW/OD \leq 0.26$ when $SW<165$ (mm); and $OD \geq 2.135 \times SW + 282.3$ when $SW \geq 165$ (mm)

FIG. 4A shows borderlines (borderlines according to linear equations) differentiating the test tires each exhibiting a good effect of reducing both rolling resistance value (RR value) and air resistance value (Cd value) thereof in a compatible manner from the test tires not causing the effect in a satisfactory manner. Specifically, one of the borderlines is constituted of a line expressing $OD=(1/0.26) \times SW$ when $SW<165$ (mm) and a line expressing $OD=2.135 \times SW+282.3$ when $SW \geq 165$ (mm).

It has been revealed from the test results shown in Tables 2-1 and 2-2, FIG. 4B and FIG. 5 that a radial tire exhibits satisfactorily low air resistance value (Cd value) and rolling resistance value (RR value) in a compatible manner in a state where the tire is mounted on a vehicle, as compared with Reference tire 1 having tire size: 195/65R15 as the conventional tire, when the tire, inflated at internal pressure ≥250 kPa, has a tire size satisfying the following formula (which formula will be referred to as "relationship formula (2)" hereinafter), provided that SW and OD represent cross sectional width and outer diameter of the tire, respectively.

$$OD \geq -0.0187 \times SW^2 + 9.15 \times SW - 380$$

FIG. 4B shows a borderline (a borderline according to a quadratic equation) differentiating the test tires each exhibiting a good effect of reducing both rolling resistance value (RR value) and air resistance value (Cd value) thereof in a compatible manner from the test tires not causing the effect in a satisfactory manner. Specifically, the borderline is constituted of a quadratic curve expressing $OD = -0.0187 \times SW^2 + 9.15 \times SW - 380$.

Further, the inventors of the present invention discovered that test tires 1 to 7 and 17, each satisfying SW/OD≤0.24, more reliably obtain the aforementioned good effect than other test tires, as shown in Tables 2-1, 2-2 and FIGS. 4A and 5.

Next, the following tests were carried out for each of test tires 1 to 18 in order to evaluate fuel efficiency and comfortability (degree of free space) of a vehicle on which the tire was mounted.

<In-Use Fuel Economy>

A test was carried out based on the JOC 8 test cycle prescribed by Ministry of Land, infrastructure, Transport and Tourism (MUT) of Japan. The evaluation results are shown as index values relative to "100" of Reference tire 1. The larger index value represents the better fuel efficiency.

<Comfortability>

Each of the test tires was mounted on a vehicle having 1.7 m width and the resulting width of the rear trunk was measured. The evaluation results are shown as index values relative to "100" of Reference tire 1. The larger index value represents the better comfortability.

The test results thus obtained are shown in Table 3 below.

TABLE 3

|  | Relationship formula (1) | Relationship formula (2) | In-use fuel economy | Comfortability |
|---|---|---|---|---|
| Test tire 1 | Satisfied | Satisfied | 117 | 105 |
| Test tire 2 | Satisfied | Satisfied | 119 | 104 |
| Test tire 3 | Satisfied | Satisfied | 105 | 105 |
| Test tire 4 | Satisfied | Satisfied | 107 | 105 |
| Test tire 5 | Satisfied | Satisfied | 112 | 104 |
| Test tire 6 | Satisfied | Satisfied | 114 | 104 |
| Test tire 7 | Satisfied | Satisfied | 116 | 104 |
| Test tire 8 | Not satisfied | Not satisfied | 100 | 104 |
| Test tire 9 | Not satisfied | Not satisfied | 101 | 102 |
| Test tire 10 | Not satisfied | Not satisfied | 106 | 101 |
| Test tire 11 | Not satisfied | Satisfied | 109 | 100 |
| Test tire 12 | Satisfied | Satisfied | 112 | 99 |
| Test tire 13 | Not satisfied | Not satisfied | 97 | 101 |
| Test tire 14 | Not satisfied | Not satisfied | 101 | 99 |
| Test tire 15 | Not satisfied | Not satisfied | 103 | 98 |
| Test tire 16 | Not satisfied | Not satisfied | 106 | 97 |
| Test tire 17 | Satisfied | Satisfied | 116 | 105 |
| Test tire 18 | Not satisfied | Not satisfied | 99 | 99 |
| Reference tire 1 | — | — | 100 | 100 |

It is understood from Table 3 that some of the test tires satisfying neither relationship formulae (1) nor relationship formula (2) (see FIGS. 4A and 4B) exhibited poorer results than Reference tire 1 in at least one of fuel efficiency and comfortability. In contrast, test tires 1 to 7, 12 and 17 (see FIGS. 4A and 4B) satisfying at least one of relationship formulae (1) and relationship formula (2) unanimously exhibited better results than Reference tire 1 in both fuel efficiency and comfortability.

The inventors of the present invention revealed from the findings described above that it is possible to reduce both air resistance value and rolling resistance value of a pneumatic radial tire in a state where the tire is mounted on a vehicle and also enhance fuel efficiency and comfortability of the vehicle by setting cross sectional width SW and outer diameter OD of the tire to satisfy the aforementioned relationship formulae (1) and/or relationship formula (2).

In this connection, the inventors of the present invention noticed that the tire satisfying the aforementioned relationship formulae (1) and/or relationship formula (2) experiences a problem inherent to a tire having narrow-width and large-diameter that: an input of force (pressure) from a road surface increases due to a narrowed width or a decrease in a ground contact area of the tire, thereby increasing a rate of deflection of a tread in the tire radial direction to increase a magnitude of strain between the belt and the bet reinforcing layer when the tire is rotated, which facilitates occurrence of separation between the belt and the belt reinforcing layer to deteriorate durability of the tire and also makes shearing force generated in rubber between the belt land the belt reinforcing layer uneven in the tire circumferential and width directions, i.e. makes distribution of ground contact pressure uneven, to deteriorate wear resistance properties of the tire. The inventors made a keen studied to solve this problem and discovered a tire structure which can solve the problem.

The tire structure for improving durability and wear resistance of a pneumatic radial tire for a passenger vehicle satisfying the aforementioned relationship formulae (1) and/or relationship formula (2), thus discovered, will be described hereinafter.

FIG. 6 is a schematic cross sectional view, in the tire width direction, of a tire according to one embodiment of the present invention. FIG. 6 shows only one half portion with respect to the tire equatorial plane CL of the tire. The other half portion of the tire shares basically the same structure as the one half portion and therefore illustration thereof will be omitted.

FIG. 6 shows a tire in a state where the tire has been assembled with a rim and inflated at the air pressure prescribed for each vehicle on which the tire is to be mounted under no load exerted thereon.

As shown in FIG. 6, provided, in a cross section in the width direction of the tire, that: P represents a point on a tread surface at the tire equatorial plane CL; m1 represents an imaginary line passing through the point P and extending in parallel to the tire width direction; m2 represents an imaginary line passing through a ground contact end E and extending in parallel to the tire width direction; $L_{CR}$ represents a distance in the tire radial direction between line m1 and line m2; and TW represents a tread width of the tire, a ratio $L_{CR}/TW$ is equal to or smaller than 0.045. The tire exemplarily shown in FIG. 6 is different from the tire exemplarily shown in FIG. 3 in this regard.

In the tire exemplarily shown in FIG. 6, a ratio W1/W2 of a width W1 in the tire width direction of the belt reinforcing layer 8 with respect to a width W2 in the tire width direction of the narrowest width belt layer 7a of the two belt layers 7a, 7b constituting the belt 7 satisfies 0.8≤W≤W1/W2≤1.05. The tire exemplarily shown in FIG. 6 is different from the tire exemplarily shown in FIG. 3 in this regard, as well.

It is critically important that the ratio $L_{CR}/TW$ is equal to or less than 0.045 in the tire of the present invention, as described above.

Other structures and the like of the tire shown in FIG. 6 are basically the same as those of the tire shown in FIG. 3.

The "width W1 in the tire width direction of the belt reinforcing layer 8" represents a width in the tire width direction of the belt reinforcing layer having the narrowest tire-width-direction width in a case where there exist a plurality of belt reinforcing layers.

An effect of the present invention will be described hereinafter.

According to the present invention, a crown portion of the tire tread is made flat and a ground contact area thereof increases so that an input of force (pressure) from a road surface is mitigated and a rate of deflection of the tread in the tire radial direction decreases to improve durability and wear resistance of the tire by setting the ratio $L_{CR}/TW$ to be in the aforementioned range.

The ratio $L_{CR}/TW > 0.045$ fails to ensure a satisfactorily large ground contact area, thereby increasing a rate of deflection of the tread to deteriorate durability and wear resistance of the tire, as described above. The ratio $L_{CR}/TW \leq 0.04$ is preferable in terms of more reliably obtaining good durability and wear resistance of the tire.

On the other hand, the ratio $L_{CR}/TW \geq 0.025$ is preferable in terms of avoiding deterioration of ground contact properties and ensuring good performances in cornering power, wear resistance and fuel efficiency of the tire.

Young' modulus of cords of the belt reinforcing layer 8 is preferably $\geq 15,000$ MPa in the present invention.

Young' modulus of cords of the belt reinforcing layer $8 \geq 15,000$ MPa enhances ring rigidity of the tire to suppress deformation thereof in the tire circumferential direction, thereby suppressing deformation thereof in the tire width direction, as well, due to incompressibility of rubber.

As a result, a relatively wide region in the tire circumferential direction of a ground contact surface is deformed by an input of force in the tire width direction from a road surface, whereby the ground contact surface takes on a configuration in which ground contact length in the tire circumferential direction does not change so much in the tire width direction.

Accordingly, partial wear resistance and cornering power of the tire improve in this case. In this connection, too high Young's modulus of cords of the belt reinforcing layer 8 decreases ground contact length of the tread as a whole and deteriorates the maximum cornering force. Young's modulus of cords of the belt reinforcing layer 8 is therefore preferably $\leq 30,000$ MPa.

Further, each belt layer 7a, 7b is a slant belt layer including belt cords extending to be inclined at an angle $\geq 45°$ with respect to the tire circumferential direction and the belt 7 is constituted of a plurality of the slant belt layers 7a, 7b such that belt cords of one slant belt layer intersect belt cords of the other slant belt layer alternately.

The belt layer preferably has the structure described above because the belt cords disposed to be inclined at a large angle with respect to the tire circumferential direction decrease out-of-plane bending rigidity in the tire circumferential direction of the tread, increases elongation in the tire circumferential direction of rubber when a ground contact surface of the tread is deformed and thus successfully suppresses a decrease in ground contact length of the tire, thereby well improving cornering power and partial wear resistance of the tire.

In this connection, the inclination angle of the belt cords of the belt layer with respect to the tire circumferential direction is preferably $\leq 75°$ in terms of avoiding deterioration of ground contact properties and ensuring good performances in cornering power, wear resistance and fuel efficiency of the tire.

In the tire of the present invention, a ratio W1/W2 of a width W1 in the tire width direction of the belt reinforcing layer 8 with respect to a width W2 in the tire width direction of the narrowest width belt layer 7a of the two belt layers 7a, 7b constituting the belt 7 preferably satisfies $0.8 \leq W1/W2 \leq 1.05$, as shown in FIG. 6.

The ratio W1/W2 is preferably $\leq 1.05$ because then a width of the belt reinforcing layer is made substantially equal to or slightly narrower than a width of the narrowest width belt layer, which not only decreases rigidity of the belt reinforcing layer to reduce strain generated due to difference in rigidity between the belt and the belt reinforcing layer and thus suppress deterioration of durability of the tire caused by the strain but also makes shearing force generated in rubber between the belt land the belt reinforcing layer uniform in the tire circumferential direction to further improve wear resistance properties of the tire. Further, the ratio $W1/W2 \leq 1.05$ improves ground contact properties of the tire, thereby improving cornering power, cornering force and fuel efficiency thereof, as well.

On the other hand, the ratio $W1/W2 \geq 0.8$ prevents a width of the belt reinforcing layer from being too narrow, ensures satisfactorily high ring rigidity and thus reliably attains good wear resistance and cornering power of the tire.

The width W2 is preferably 0.85 to 1.10 times as much as the tread width TW.

The tire of the present invention preferably has air volume $\geq 15,000$ cm$^3$ because a tire for a passenger vehicle must have an air volume $\geq 15,000$ cm$^3$ in order to reliably have the minimum loading capacity essentially required of a passenger car running on public roads.

EXAMPLES

Test tires of Examples 1 to 5 and test tires of Comparative Examples 1 to 4 were prepared and subjected to tests described below for evaluating various performances of the tires in order to confirm an effect of the present invention.

Specifically, each of the test tires of Examples 1 to 5 and Comparative Examples 1 to 4 has a pair of bead portions and a carcass provided to extend in a toroidal shape across the pair of bead portions, as shown in FIG. 3 and FIG. 6, respectively.

Further, the test tire has a belt constituted of two belt layers, a belt reinforcing layer, and a tread provided on the outer side in the tire radial direction of the carcass in this order. The two belt layers are slant belt layers provided such that belt cords of one layer intersect belt cords of the other layer alternately and that steel cords as the belt cords of each layer extend to be inclined at an inclination angle of $\pm 60°$ with respect to the tire circumferential direction.

Cords of the belt reinforcing layer are made of nylon and extend substantially in the tire circumferential direction.

<Rolling Resistance (RR Value)>

Rolling resistance was measured by: inflating each of the test tires at air pressure as prescribed for each vehicle on which the tire was to be mounted; exerting on the tire 80% of the maximum load prescribed for the vehicle on which the tire was to be mounted; and running the tire at drum rotation speed of 100 km/hour to measure a rolling resistance thereof.

The evaluation results are shown as index values relative to "100" of Comparative Example 3. The smaller index value represents the smaller rolling resistance.

<Durability>

Durability was measured by: inflating each of the test tires at air pressure as prescribed for each vehicle on which the tire was to be mounted; exerting on the tire the maximum load prescribed for the vehicle on which the tire was to be mounted; subjecting the tire to a drum durability test at high speed, i.e. running the tire on a drum under the aforementioned conditions and increasing the speed from 120 km/hour stepwise by 10 km/hour for every 5 minutes until the tire had a trouble; recoding the speed at which the trouble occurred as a measurement value for evaluating durability of the tire. The evaluation results are shown as index values relative to "100" representing the speed at which a trouble occurred in the Comparative Example 3 tire. The larger index value represents the better durability.

<Cornering Power>

Cornering power of each test tire was measured by using a flat belt type tire testing apparatus for measuring the cornering characteristics thereof at the air pressure and under the maximum load as respectively prescribed for each vehicle on which the tire was to be mounted, at drum rotation speed of 100 km/hour.

The cornering power values thus measured were converted to index values relative to the cornering power value "100" of Comparative Example 3 tire for evaluation. The larger index value represents the larger and thus more preferable cornering power.

<Wear Resistance>

Wear resistance of each test tire was determined by: running the tire 30,000 km on a drum testing machine at 80 km/hour at the air pressure and under the maximum load as respectively prescribed for each vehicle on which the tire was to be mounted; and measuring a remaining groove depth after the running on the drum as a wear resistance value. The wear resistance values thus measured were converted to index values relative to the wear resistance value "100" of Comparative Example 3 tire for evaluation. The larger index value represents the better wear resistance.

The relevant characteristics and evaluation results of the respective test tires are shown in Table 4.

rolling resistance value and better or higher durability, cornering power and wear resistance values than the tire of Comparative Example 4.

REFERENCE SIGNS LIST

1 Bead portion
2 Carcass
3 Belt
3a Narrowest width belt layer
4 Tread
5 Belt reinforcing layer
6 Main groove
7 Belt
7a Narrowest width belt layer
8 Belt reinforcing layer
TW Tread width
CL Tire equatorial plane
E Ground contact end

The invention claimed is:

1. A tire-rim assembly formed by assembling a pair of bead portions of a passenger vehicle pneumatic radial tire with a rim, having a carcass constituted of plies as radially-disposed carcass cords and provided in a toroidal shape across the pair of bead portions, a belt constituted of at least one belt layer, and at least one belt reinforcing layer as a rubber-coated cord layer extending in the tire circumferential direction, the belt being provided on the outer side in the tire radial direction of the carcass, and the belt reinforcing layer being provided on the outer side in the tire radial direction of all the belt layers, characterized in that:

provided that SW and OD represent cross sectional width and outer diameter of the tire, respectively, $0.125 \leq SW/OD \leq 0.26$ and $115 \text{ (mm)} < SW < 165 \text{ (mm)}$ provided, in a cross section in the width direction of the tire, that: m1 represents an imaginary line passing through a point P on a tread surface at the tire equatorial

TABLE 4

|  | Comp. Example 1 | Comp. Example 2 | Comp. Example 3 | Example 1 | Comp. Example 4 | Example 2 | Example 3 | Example 4 | Example 5 |
| --- | --- | --- | --- | --- | --- | --- | --- | --- | --- |
| Tire size | 175/65R15 | 175/65R15 | 135/60R21 | 135/60R21 | 135/60R21 | 135/60R21 | 135/60R21 | 135/60R21 | 135/60R21 |
| SW/OD | 0.28 | 0.28 | 0.19 | 0.19 | 0.19 | 0.19 | 0.19 | 0.19 | 0.19 |
| $L_{CR}$/TW | 0.05 | 0.05 | 0.05 | 0.04 | 0.05 | 0.04 | 0.04 | 0.04 | 0.04 |
| W1/W2 | 1.1 | 0.9 | 1.1 | 1.1 | 0.9 | 0.9 | 0.75 | 0.8 | 1.05 |
| Rolling resistance value (RR value) | 118 | 122 | 100 | 89 | 87 | 82 | 80 | 81 | 85 |
| Durability | 105 | 111 | 100 | 109 | 112 | 115 | 107 | 108 | 113 |
| Cornering power | 98 | 100 | 100 | 106 | 102 | 110 | 103 | 104 | 108 |
| Wear resistance | 104 | 106 | 100 | 109 | 106 | 113 | 106 | 108 | 111 |

It is understood from Table 4 that the tires of Examples 1 to 5 unanimously exhibit lower rolling resistance values and better or higher durability, cornering power and wear resistance values than the tires of Comparative Examples 1 and 3.

Further, it is understood from comparison of Example 2 with Comparative Example 2 in Table 4 that the tire of Example 2 in which the relationship of SW and OD has been optimized exhibits lower rolling resistance value and better or higher durability, cornering power and wear resistance values than the tire of Comparative Example 2. Yet further, it is understood from comparison of Example 2 with Comparative Example 4 in Table 4 that the tire of Example 2 in which the ratio $L_{CR}$/TW been optimized exhibits lower plane and extending in parallel to the tire width direction; m2 represents an imaginary line passing through a ground contact end E and extending in parallel to the tire width direction; $L_{CR}$ represents a distance in the tire radial direction between line m1 and line m2; and TW represents a tread width of the tire, a ratio $L_{CR}/TW \leq 0.045$;

a ratio W1/W2 of a width W1 in the tire width direction of the belt reinforcing layer with respect to a width W2 in the tire width direction of the belt layer having the narrowest width among the at least one belt layers constituting the belt satisfies $0.8 \leq W1/W2 \leq 1.05$, SW and D satisfy:
$0.30 < SW/D \leq 0.52$, where D represents a rim diameter of the tire, the tire-rim assembly is filled only with gas,
wherein the internal pressure of the tire-rim assembly is less than or equal to 350 kPa,
wherein the rim diameter of the tire is greater than or equal to 406.4 mm and less than or equal to 584.2 mm,
wherein an aspect ratio of the tire is less than 70, and
wherein the outer diameter of the tire is greater than or equal to 580.4 mm and less than or equal to 751.3 mm.

2. The tire-rim assembly of claim 1, wherein SW/OD≤0.24.

3. The tire-rim assembly of claim 1, wherein Young' modulus of cords of the belt reinforcing layer is ≥15,000 MPa.

4. The tire-rim assembly of claim 1, wherein each belt layer is a slant belt layer including belt cords extending to be inclined at an angle ≥45° with respect to the tire circumferential direction and the belt is constituted of a plurality of the slant belt layers such that belt cords of one slant belt layer intersect belt cords of the other slant belt layer alternately.

5. The tire-rim assembly of claim 1, wherein the ratio $L_{CR}$/TW is between a range of 0.025≤the ratio $L_{CR}$/TW≤0.045.

6. The tire-rim assembly of claim 1, wherein the tire has only three tread reinforcing members constituted of: two belt layers where belt cords of one belt layer intersect belt cords of the other belt layer; and a single belt reinforcing layer, the belt layers and the belt reinforcing layer being provided on the carcass in this order on the outer side in the radial direction.

7. The tire-rim assembly of claim 1, wherein each half portion of the tread surface is provided with only one main groove extending in the tire circumferential direction.

8. The tire-rim assembly of claim 1, wherein the ratio $L_{CR}$/TW is between a range of 0.025≤the ratio $L_{CR}$/TW≤0.045 for each $L_{CR}$ of respective half portions, sectioned by the tire equatorial plane, of the tire.

9. The tire-rim assembly of claim 1, wherein the internal pressure of the tire-rim assembly is greater than or equal to 250 kPa.

10. A tire-rim assembly formed by assembling a pair of bead portions of a passenger vehicle pneumatic radial tire with a rim, having a carcass constituted of plies as radially-disposed carcass cords and provided in a toroidal shape across the pair of bead portions, a belt constituted of at least one belt layer, and at least one belt reinforcing layer as a rubber-coated cord layer extending in the tire circumferential direction, the belt being provided on the outer side in the tire radial direction of the carcass, and the belt reinforcing layer being provided on the outer side in the tire radial direction of all the belt layers, characterized in that:

provided that SW and OD represent cross sectional width and outer diameter of the tire, respectively, SW and OD satisfy a formula shown below $$OD \geq -0.0187 \times SW^2 + 9.15 \times SW - 380;$$

provided, in a cross section in the tire width direction of the tire, that: m1 represents an imaginary line passing through a point P on a tread surface at the tire equatorial plane and extending in parallel to the tire width direction; m2 represents an imaginary line passing through a ground contact end E and extending in parallel to the tire width direction; $L_{CR}$ represents a distance in the tire radial direction between line m1 and line m2; and TW represents a tread width of the tire, a ratio $L_{CR}$/TW≤0.045; and a ratio W1/W2 of a width W1 in the tire width direction of the belt reinforcing layer with respect to a width W2 in the tire width direction of the belt layer having the narrowest width among the at least one belt layers constituting the belt satisfies 0.8≤W1/W2≤1.05, SW and D satisfy:
0.30<SW/D≤0.52, where D represents a rim diameter of the tire, and the tire-rim assembly is filled only with gas,
wherein the internal pressure of the tire-rim assembly is less than or equal to 350 kPa,
wherein the rim diameter of the tire is greater than or equal to 406.4 mm and less than or equal to 584.2 mm,
wherein an aspect ratio of the tire is less than 70, and
wherein the outer diameter of the tire is greater than or equal to 580.4 mm and less than or equal to 751.3 mm.

11. The tire-rim assembly of claim 10, wherein the ratio $L_{CR}$/TW is between a range of 0.025≤the ratio $L_{CR}$/TW≤0.045.

12. The tire-rim assembly of claim 10, wherein the tire has only three tread reinforcing members constituted of: two belt layers where belt cords of one belt layer intersect belt cords of the other belt layer; and a single belt reinforcing layer, the belt layers and the belt reinforcing layer being provided on the carcass in this order on the outer side in the radial direction.

13. The tire-rim assembly of claim 10, wherein each half portion of the tread surface is provided with only one main groove extending in the tire circumferential direction.

14. The tire-rim assembly of claim 10, wherein the tire size is one of 165/55R21, 155/55R19, 165/55R20, 165/65R19, 175/55R21, 165/55R19, 175/55R20, 175/65R19, 185/55R21, 145/50R19, 145/55R19, 145/60R18.

15. The tire-rim assembly of claim 10, wherein the ratio $L_{CR}$/TW is between a range of 0.025≤the ratio $L_{CR}$/TW≤0.045 for each $L_{CR}$ of respective half portions, sectioned by the tire equatorial plane, of the tire.

16. The tire-rim assembly of claim 15, wherein SW<165 (mm) and 0.125≤SW/OD≤0.26 and 115 (mm)<SW<165 (mm).

17. The tire-rim assembly of claim 10, wherein SW≥165 (mm) and SW/OD≥0.125.

18. The tire-rim assembly of claim 17, wherein SW/OD≥0.24.

19. The tire-rim assembly of claim 10, wherein the section width SW is greater than or equal to 165 mm.

20. The tire-rim assembly of claim 10, wherein the internal pressure of the tire-rim assembly is less than or equal to 250 kPa.

21. The tire-rim assembly of claim 10, wherein the tire size is one of 165/55R21, 165/55R20, 165/65R19, 175/55R21, 165/55R19, 175/55R20, 175/65R19, and 185/55R21.

22. A tire-rim assembly formed by assembling a pair of bead portions of a passenger vehicle pneumatic radial tire with a rim, having a carcass constituted of plies as radially-disposed carcass cords and provided in a toroidal shape across the pair of bead portions, a belt constituted of at least one belt layer, and at least one belt reinforcing layer as a rubber-coated cord layer extending in the tire circumferential direction, the belt being provided on the outer side in the tire radial direction of the carcass, and the belt reinforcing layer being provided on the outer side in the tire radial direction of all the belt layers, characterized in that:

provided that SW and OD represent cross sectional width and outer diameter of the tire, respectively, SW and OD satisfy a formula shown below $$OD \geq -0.0187 \times SW^2 + 9.15 \times SW - 380; \text{ and}$$

provided, in a cross section in the tire width direction of the tire, that: m1 represents an imaginary line passing through a point P on a tread surface at the tire equatorial plane and extending in parallel to the tire width direction; m2 represents an imaginary line passing through a ground contact end E and extending in parallel to the tire width direction; $L_{CR}$ represents a distance in the tire radial direction between line m1 and line m2; and TW represents a tread width of the tire, a ratio $L_{CR}/TW \leq 0.045$ wherein SW is equal to or larger than 165 (mm) and SW/OD is equal to or larger than 0.24, SW and D satisfy:

$0.30 < SW/D \leq 0.52$, where D represents a rim diameter of the tire, the tire-rim assembly is filled only with gas, wherein the internal pressure of the tire-rim assembly is less than or equal to 350 kPa, wherein the rim diameter of the tire is greater than or equal to 406.4 mm and less than or equal to 584.2 mm, wherein an aspect ratio of the tire is less than 70, and wherein the outer diameter of the tire is greater than or equal to 580.4 mm and less than or equal to 751.3 mm.

23. The tire-rim assembly of claim 22, wherein the ratio $L_{CR}/TW$ is between a range of $0.025 \leq$ the ratio $L_{CR}/TW \leq 0.045$ for each $L_{CR}$ of respective half portions, sectioned by the tire equatorial plane, of the tire.

24. The tire-rim assembly of claim 22, wherein the internal pressure of the tire-rim assembly is less than or equal to 250 kPa.

* * * * *